United States Patent

[11] 3,602,230

| | | |
|---|---|---|
| [72] | Inventor | William H. Knapp<br>Davenport, Iowa |
| [21] | Appl. No. | 790,223 |
| [22] | Filed | Jan. 10, 1969 |
| [45] | Patented | Aug. 31, 1971 |
| [73] | Assignee | International Harvester Company<br>Chicago, Ill. |

[54] DUST-SETTLING DEVICE
4 Claims, 2 Drawing Figs.

[52] U.S. Cl. .................................. 130/29,
130/27 T
[51] Int. Cl. .................................. A01f 12/48
[50] Field of Search ..................... 130/24, 26,
27.6, 27.5, 27.17, 27.31, 27.32, 29

[56] References Cited
UNITED STATES PATENTS

| 1,744,334 | 1/1930 | Schlayer | 130/27.17 |
| 2,363,632 | 11/1944 | Weaver | 130/27.17 |
| 2,507,669 | 5/1950 | Heth | 130/27.32 |

*Primary Examiner*—Antonio F. Guida
*Attorney*—Floyd B. Harman

ABSTRACT: An apparatus for settling the dust and chaff discharged with the straw from the cylinder of an axial flow combine before releasing this material into the atmosphere. An elongated settling chamber having a material inlet opening and a bottom conveyor moving from the inlet opening toward an exit opening that is vented to the atmosphere.

PATENTED AUG 31 1971

3,602,230

INVENTOR
WILLIAM H. KNAPP
BY ATT'Y.

DUST-SETTLING DEVICE

BACKGROUND OF THE INVENTION

1. Field of the Invention

The present invention relates generally to improvements in harvesting machines and the like and more particularly to a new and improved axial flow combine wherein there is provided a settling chamber through which the straw and other debris discharged from the cylinder must pass before it is released to the atmosphere.

2. Description of the Prior Art:

This invention concerns a combine that operates on a completely different principle than the current commercially available combines. In the combine described in the subject patent, an elongated rotor is provided along the longitudinal axis of the combine. The elongated rotor is enclosed within a cylinder having transport fins provided along its internal upper surface and a concave and grate forming its lower surface. The material to be threshed is fed into the front end of the cylinder where it is processed by the cooperating elements of the rotor and cylinder. After the initial threshing of the incoming material, it is indexed rearwardly by the first transport fin and is then subjected to a second threshing and so on until the material reaches the end of the cylinder. At the end of the cylinder, the straw and other debris is expelled from the cylinder through the straw discharge opening. As a result of the multiple threshing and separating exposures, the size of the straw and the quantity of dust and fines is much higher in an axial flow combine than in a conventional combine. Also, this debris is supported in a pressurized current of air which when discharged into the atmosphere creates a debris-laden cloud. Such a cloud is undesirable since it pollutes the air about the combine inhibiting the operator's breathing and visibility. Furthermore, this polluted air is undesirable for the various machine uses such as air for the engine's combustible mixture, for cooling the radiator and for the combine grain-cleaning system. A more complete disclosure of an axial flow combine of the type described above can be found in U.S. Pat. to Schlayer No. 1,744,334 of Jan. 21, 1930 and in, the copending U.S. Pat. applications of Rowland-Hill et al, Ser. No. 576,151 filed Aug. 30, 1966 which issued on Dec. 2, 1969 as U.S. Pat. No. 3,481,342 and Knapp et al. Ser. No. 588,191 filed on Oct. 20, 1966 which issued on Oct. 7, 1969 as U.S. Pat. No. 3,470,881.

SUMMARY

The general purpose of this invention is to provide a settling chamber for an axial flow combine to allow expansion of the air discharged from the cylinder and settlement of the debris supported thereby. To attain this, the present invention contemplates a unique elongated settling chamber having a bottom conveyor for moving material deposited thereon towards and through an exit opening in the chamber. The chamber is provided with an inlet opening above the bottom conveyor that is connected to the straw discharge opening of the cylinder. A straw distributor located below the exit opening functions to spread the material in a wide swath trailing the combine.

An object of the present invention is to provide an axial flow combine with a settling chamber through which all material expelled through the straw discharge opening of the cylinder must pass to permit settling of this material and prevent the creation of a debris-laden cloud.

DESCRIPTION OF THE PREFERRED EMBODIMENT

Figures 1, 2:
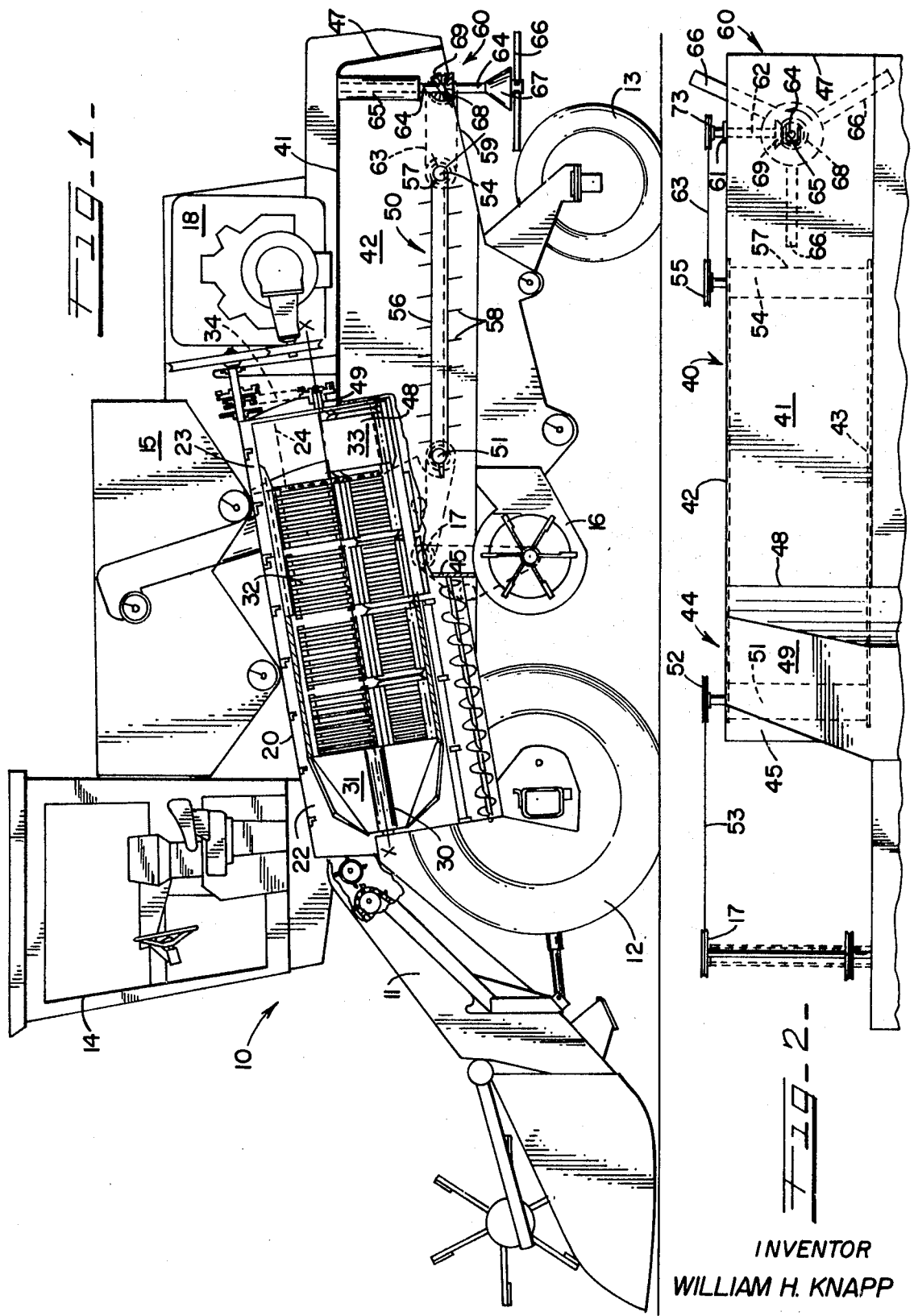
FIG. 1 is a side view of an axial flow combine having a portion of the cylinder and sidewall cut away to expose the rotor.
FIG. 2 is an enlarged top view of the elongated settling chamber.

Referring now to the drawings wherein like reference characters designate like or corresponding parts throughout the several views, there is shown in FIG. 1 an axial flow combine designated 10 having a header 11, drive wheels 12, a rear axle 19 and dirigible wheels 13, an operator's cab 14, a grain tank 15, an engine 18, and a cleaning system fan 16 having drive means 17. The threshing and separating section of the axial flow combine includes a tubular casing 20 lying along a horizontal axis designated X—X. The tubular casing 20 has a forward end 22 and a rearward end 23. A straw discharge opening 24 is formed in the tubular casing 20 at the rearward end 23. An elongated rotor 30 including an impeller 31, a plurality of open open blades 32 and straw discharge paddles 33 is mounted within the tubular casing 20 about the axis X—X. The elongated rotor 30 is connected to and driven by the engine 18 by the drive means 34.

As seen in FIG. 2, there is an elongated settling chamber 40 located alongside and to the right of the tubular casing 20 when looking towards the front of the combine. The elongated settling chamber 40 has a top wall 41, an outside wall 42, an inside wall 43, a front wall 45, and a rear wall 47. The end of the elongated settling chamber having the front wall 45 is designated the first end 44 and the end having the rear wall 47 is designated the second end 46. An inlet opening 48 is formed in the first end 44 which in the illustrated embodiment, is formed in the top wall 41 and the inside wall 43. A conduit means 49 connects the straw discharge opening 24 of the tubular casing 20 with the inlet opening 49 of the elongated settling chamber 40.

A bottom conveyor means 50 is mounted within the elongated settling chamber and functions to convey material that settles thereon in a direction from the first end 44 towards the second end 46. The illustrated bottom conveyor means 50 comprises an endless belt 56 mounted upon a front roller 51 and a rear roller 54, however, a chain and slat-type conveyor could also be used. The outer surface of said endless belt 56 has a plurality of fingers 58 projecting therefrom. The front roller 51 is located in the first end 44 of the elongated settling chamber adjacent the front wall 45. The rear roller 54 is located in the second end 46 of said elongated settling chamber, but spaced from the rear wall 47. The endless belt 56 thus has a terminal edge 57 that is spaced from the rear wall 47 to define with the outside wall 42, the inside wall 43 and the rear wall 47, an exit opening designated 59. To ensure that the material discharged from the settling chamber will be distributed behind the combine, it is important that opening 59 be located rearwardly of the rear axle.

As can be best seen in FIG. 2, there is a pulley 52 carried by the front roller 51 and this pulley is connected by a belt 53 to the fan driving means 17. Thus rotary motion is supplied to the bottom conveyor means 50 from the same drive shaft that supplies power to the cleaning system fan 16. For purposes that shall be further discussed there is also a pulley 55 connected to the rear roller 54.

A straw-spreading means designated 60 is mounted below the exit opening 59 and functions to distribute the material falling through the exit opening over a wide swath trailing the combine. The straw spreading means 60 includes a vertical shaft 64 mounted in bearings 65. There are a plurality of radial arms 66 extending from the vertical shaft 64 and a cone 67 shielding the intersection of the radial arms 66 with the vertical shaft 64. A bevel gear 68 is secured to the vertical shaft 64 and meshes with another bevel gear 69 carried by a horizontal stub shaft 62. Stub shaft 62 extends though the outer wall 42 and is supported by a bearing 61. A pulley 70 aligned with pulley 55 is carried by stub shaft 62 externally of the settling chamber. Pulleys 55 and 70 are connected by a belt 63. Through this drive arrangement, rotary motion is transferred from the pulley 55 of the rear roller to the stub shaft 62 and then to the vertical shaft 64. As indicated by the arrow in FIG.

2, the vertical shaft 64 rotates in a counterclockwise direction so that the spread pattern is skewed to the left to compensate for the location of the settling chamber.

Operation: The header 11 cuts and collects material as the combine 10 moves through the field and delivers this unthreshed material axially into the forward end 22 of the tubular casing 20. This material is threshed and separated as it is indexed rearwardly along the tubular casing 20 and what remains at the rearward end 23 is discharged from the tubular casing through the straw discharge opening 24. Because of the large amount of abrasive action that this material has been subjected to, it has been reduced to small pieces and a large quantity of dust and fines have been developed. This material is supported in a stream of pressurized air and if released to the atmosphere, would create a debris laden cloud. In accordance with the subject invention, this material is discharged into the settling chamber, wherein the air expands and the material supported thereby settles out coming to rest on the bottom conveyor. The bottom conveyor moves the settled material towards the exit opening formed in the chamber and discharges it through this opening. The discharged material then encounters the straw-spreading means which distributes the straw in a wide swath trailing the combine.

It should be understood, of course, that the foregoing disclosure relates to only a preferred embodiment of the invention and that numerous modifications or alterations may be made therein.

What I claim is:

I claim:

1. In an axial flow combine comprising a tubular casing formed about a generally horizontal axis and having a forward end through which unthreshed material is received, a grain permeable bottom through which the threshed grain can pass and a rearward end, a straw discharge opening formed in the rearward end of said tubular casing;

an elongated rotor journaled for rotation about said axis within said casing, said elongated rotor having straw discharge paddles that function to propel material through said straw discharge opening;

an elongated settling chamber having a front wall and a rear wall, conduit means connecting said straw discharge opening with said elongated settling chamber adjacent said front wall, a bottom conveyor extending from said front wall toward said rear wall, said bottom conveyor having a terminal edge between said front and rear walls, said terminal edge defining with said rear wall an exit opening through which the conveyor is adopted to discharge material.

2. the invention as set forth in claim 1 wherein there is a straw-spreading means below said exit opening disposed to spread material falling through said exit opening.

3. The invention as set forth in claim 1 wherein said bottom conveyor comprises an endless belt mounted upon a front roller adjacent said front wall and a rear roller adjacent said terminal edge, and means driving said endless belt in a direction such that the upper rung moves from said front wall towards said rear wall.

4. The invention as set forth in claim 2 wherein said elongated settling chamber is offset from said tubular casing and said straw-spreading means is arranged to produce a spread pattern that is skewed toward said tubular casing.